UNITED STATES PATENT OFFICE.

JOHN A. JUST, OF SYRACUSE, NEW YORK.

RENNET EXTRACT AND PROCESS OF MAKING SAME.

SPECIFICATION forming part of Letters Patent No. 661,765, dated November 13, 1900.

Application filed December 27, 1899. Serial No. 741,722. (No specimens.)

*To all whom it may concern:*

Be it known that I, JOHN A. JUST, of 109 West Kennedy street, Syracuse, in the county of Onondaga, in the State of New York, have invented a new and useful Process of Preparing Rennet Extract, of which the following is a full, clear, and exact description.

My invention relates to the preparation of rennet ferment; and it consists in a new process and a new product.

The rennet ferment (rennet extract) of commerce, notwithstanding the preventive measures taken, deteriorates and loses a considerable part of its coagulative power soon after its preparation. I have discovered that I can practically avoid this loss and make rennet ferment substantially stable for a long time by preparing it in a new menstruum.

My new menstruum is a solution of calcium chlorid, and my method of preparation is as follows: I soak well-cured stomachs (rennets) of calves or other young animals in a weak solution of calcium chlorid until the ferment is given up. A three to eight per cent. solution of calcium chlorid may be used for this purpose; but I have found a five-per-cent. solution to be the most suitable, for if the solution is too weak an undue amount of mucus will come off, and if too strong the extraction of the ferment will be retarded. When the extraction is complete, I draw off the extract solution and add to it sufficient additional calcium chlorid (in solid form or in the form of a concentrated solution) to make it contain from eight to fourteen per cent. of that compound. Any mucus that the extract solution may contain is then separated by filtering. An excess of calcium chlorid—more than about fourteen per cent.—will begin to precipitate the ferment in my solution. The calcium chlorid should therefore not be added in such proportion that a precipitation of the ferment takes place. I may extract the ferment from the rennets in any other suitable solution, such as a solution of acidulated water, and then add calcium chlorid to it; but in practice I prefer to extract the ferment in a solution of calcium chlorid, as stated.

My new method is not only more simple and direct, but also increases the yield of rennet ferment obtained from the rennets.

What I claim as my invention, and desire to secure by Letters Patent, is—

1. The hereinbefore-described composition consisting of rennet ferment and a solution of calcium chlorid.

2. The hereinbefore-described process of preparing rennet ferment which consists in extracting said ferment from rennets by means of a weak solution of calcium chlorid, and in afterward adding additional calcium chlorid to said extract solution and filtering it, substantially as described.

In testimony whereof I have hereunto signed my name.

JOHN A. JUST. [L. S.]

Witnesses:
FRED B. WILBUR,
M. T. BROWNELL.